3,201,454
LOWER ALKYL N-(2-(LOWER ALKYL)CYCLO-
PROPYLMETHYL) CARBAMATES
William J. Considine, Franklin Township, Jack Bernstein,
New Brunswick, and John C. Burke, Milltown, N.J.,
assignors to Olin Mathieson Chemical Corporation,
New York, N.Y., a corporation of Virginia
No Drawing. Original application Dec. 26, 1960, Ser.
No. 78,870, now Patent No. 3,156,722, dated Nov. 10,
1964. Divided and this application Jan. 28, 1963, Ser.
No. 254,437
4 Claims. (Cl. 260—468)

This application is a division of a co-pending application Serial No. 78,870, filed December 26, 1960, now U.S. 3,156,722.

This invention relates to new cyclopropane derivatives and more particularly, to alkylcyclopropanemethylamine and alkylcyclopropanemethylcarbamic acid esters, and to methods for their preparation.

The compounds of this invention have the following general formula

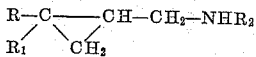

wherein R is hydrogen or lower alkyl, $R_1$ is lower alkyl, and $R_2$ is carbo(lower alkoxy) [—COO(lower alkyl)]. Those compounds of this invention, wherein $R_2$ is carbo(lower alkoxy), possess central nervous system depressant activity and thus may be used as anticonvulsants or as sedatives. For such purposes the compounds may be administered perorally (e.g., in capsule, tablet or elixir form).

The carbamic acid esters of this invention, wherein $R_2$ is carbo(lower alkoxy), can be prepared by reacting the primary amines with a chloroformate, such as a lower alkyl chloroformate (e.g., methyl and ethyl chloroformate).

The primary amine starting material of this invention, i.e.,

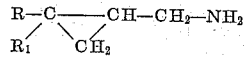

wherein R and $R_1$ are as hereinbefore defined, are prepared by the reduction of the corresponding nitriles employing a hydrogenating agent, such as lithium aluminum hydride.

Those nitriles utilizable as starting materials in the processes of this invention which are new compounds can be prepared from the corresponding 2-R, 2-$R_1$-1,3-propanediols by reacting the latter with p-toluenesulfonyl chloride to yield the corresponding p-toluenesulfonic acid diesters, which are then reacted with potassium cyanide to give the corresponding 2-R, 2-$R_1$-cyclopropanecarbonitrile. Among the suitable propanediols may be mentioned 2-(lower alkyl)-1,3-propanediols, such as 2-methyl-1,3-propanediol, 2-ethyl-1,3-propanediol, 2-n-propyl-1,3-propanediol, 2-isopropyl-1,3-propanediol, 2-n-butyl-1,3-propanediol and 2-n-hexyl-1,3-propanediol; and 2,2-di(lower alkyl)-1,3-propanediols, such as 2,2-dimethyl-1,3-propanediol, 2-methyl-2-ethyl-1,3-propanediol-2,2-diethyl-1,3-propanediol, 2-methyl-2-propyl-1,3-propanediol, 2-ethyl-2-n-butyl-1,3-propanediol and 2-methyl-2-n-hexyl-1,3-propanediol.

The new nitrile starting materials can be prepared as detailed in the following examples leading to the formation of 2-methyl-2-propylcyclopropanecarbonitrile:

EXAMPLE A

*p-Toluenesulfonic acid, diester with 2-methyl-2-propyl-1,3-propanediol*

A solution of 545 grams of p-toluenesulfonyl chloride in 1200 ml. of pyridine is cooled to 0° and 125 grams of 2-methyl-2-n-propyl-1,3-propanediol in 200 ml. of pyridine is added dropwise with vigorous stirring. The reaction mixture is cooled in an ice bath during the addition, stirred for an additional two hours and then is allowed to warm to room temperature during the next twenty hours. The reacton mixture is then poured into two liters of ice and water. The precipitated solid is filtered, washed with water, dilute sulfuric acid, dilute aqueous sodium carbonate and again with water. The product melts at about 66–68° C. and is sufficiently pure for use in Example B. Recrystallization from ethyl acetate and pentane gives the pure product, M.P. about 68–70° C.

EXAMPLE B

*2-methyl-2-n-propylcyclopropanecarbonitrile*

A mixture of 660 grams of p-toluenesulfonic acid, diester with 2-methyl-2-n-propyl-1,3-propanediol and 292.5 grams of potassium cyanide in 4.5 liters of ethylene glycol is heated and allowed to distill slowly until the temperature of the vapor distilling is 195° C. The top phase of the distillate is separated and the lower phase is extracted three times with n-pentane. The pentane extracts are then combined with the upper phase and washed three times with water. The pentane is removed by distillation and the residue fractionally distilled to obtain the product, boiling at about 81–83° at 8 mm.

The following examples illustrate the invention (all temperatures given are in degrees centigrade):

EXAMPLE 1

*2,2-diethylcyclopropanemethylamine hydrochloride*

14.8 g. of lithium aluminum hydride is added to 700 ml. of absolute ether and the suspension stirred at reflux for one-half hour. The suspension is cooled and a solution of 33.3 g. of 2,2-diethylcyclopropanecarbonitrile in 50 ml. of absolute ether is added dropwise with stirring. The mixture is stirred and refluxed for one hour, then cooled, and 32.4 g. of water added with caution. The reaction mixture is then cooled and filtered. The filter cake is washed with 250 ml. of ether and the combined filtrate and washes are dried with potassium hydroxide pellets.

The dried ether solution is filtered and 62.5 ml. of a 4.02 N solution of hydrogen chloride in ether is added. The white needles which form are washed with dry ether. The dry material weighs about 33.4 g.; M.P. about 220–222° (dec.), and upon one recrystallization from acetonitrile gives about 28.0 g. of 2,2-diethylcyclopropanemethylamine hydrochloride as broad white needles; M.P. about 225–225.5°.

EXAMPLE 2

*N-(2,2-diethylcyclopropylmethyl)carbamic acid, ethyl ester*

23.0 g. of 2,2-diethylcyclopropanemethylamine hydrochloride is added to a solution of 11.2 g. of sodium hydroxide in 250 ml. of water cooled in an ice-bath. 15.4 g. of ethyl chloroformate is added to the stirred mixture at such a rate that the temperature does not rise above 5°. The reaction mixture is allowed to stir until the pH has reached a constant value of 8.4. It is then extracted with 500 ml. of ether and the ether layer washed with 50 ml. portions of water, 1% hydrochloric acid, and a saturated sodium bicarbonate solution and dried over anhydrous magnesium sulfate.

Concentration of the ether yields about 20.0 g. of a colorless liquid; $n_D^{20}$ 1.4533, which upon distillation, gives about 14.4 g. of N-(2,2-diethylcyclopropylmethyl)carbamic acid, ethyl ester; $n_D^{20}$ 1.4550; B.P. about 92–97°/0.25 mm.

*Analysis.*—Calcd. for $C_{11}H_{21}NO_2$: C, 66.29; H, 10.62; N, 7.03. Found: C, 66.59; H, 10.68; N, 7.02.

EXAMPLE 3

2-methyl-2-n-propylcyclopropanemethylamine hydrochloride 17.8 g. of lithium aluminum hydride is stirred and refluxed with 900 ml. of absolute ether for 0.5 hour. When cool, a solution of 40.0 g. of 2-methyl-2-n-propylcyclopropylcarbonitrile in 100 ml. of absolute ether is added to the stirred suspension at a rate sufficient to maintain reflux. The reaction mixture is stirred and refluxed for one hour and allowed to cool. 37.8 g. of water is slowly added and the suspension is stirred for an additional hour. The mixture is filtered and the filter cake washed with absolute ether. The combined filtrate and washes are dried for one hour over potassium hydroxide pellets and filtered. 86 ml. of a 4.2 N ethereal hydrogen chloride solution is added to the filtrate. After cooling, the white plates formed are collected by filtration, washed with absolute ether, and allowed to dry in the air. In this manner, about 40.4 g. of 2-methyl-2-n-propylcyclopropanemethylamine hydrochloride; M.P. about 169.0–170.5° is obtained.

EXAMPLE 4

N-(2-methyl-2-n-propylcyclopropylmethyl)carbamic acid, ethyl ester 32.0 g. of 2-methyl-2-n-propylcyclopropanemethylamine hydrochloride is dissolved in a solution of 16.0 g. of sodium hydroxide in 400 ml. of water. The solution is cooled in an ice bath and during stirring 23.4 g. of ethyl chloroformate is added at such a rate that the temperature does not exceed 10°. Stirring is continued for one hour after the addition is completed and the reaction mixture is then extracted with a 500 ml. and a 250 ml. portion of ether. The combined extracts are washed with 100 ml. portions of water, 1% aqueous hydrochloric acid, saturated aqueous sodium bicarbonate, and water again and then dried with anhydrous magnesium sulfate.

Evaporation of the ether gives about 38.5 g. of a yellowish liquid. Fractionation with a Vigreux column gives about 30.4 g. of N-(2-methyl-2-n-propylcyclopropylmethyl)carbamic acid, ethyl ester; B.P. 99–102°/0.5 mm.; $n_D^{23}$ 1.4512.

EXAMPLE 5

N-methyl-2,2-diethylcyclopropanemethylamine (*a*) *Preparation of N-(2,2-diethylcyclopropanemethyl formamide.*—To twenty-five grams of formic acid (98–100%) there is added dropwise, with vigorous stirring, nineteen grams of 2,2-diethylcyclopropanemethyl-amine and the reaction mixture is heated under reflux for 8 hours. The excess acid is then removed by distillation under reduced pressure and the cooled residue is diluted with 100 ml. of water. The aqueous suspension is treated with solid potassium carbonate and the organic material extracted with chloroform. The chloroform solution is washed with dilute hydrochloric acid, saturated sodium chloride solution and then dried over anhydrous magnesium sulfate. The desired N-(2,2-diethylcyclopropanemethyl)formamide is obtained by concentration of the chloroform first at atmospheric pressure and finally under reduced pressure.

(*b*) *Preparation of N-methyl-2,2-diethylcyclopropanemethylamine.*—To a suspension of 3.8 grams of lithium aluminum hydride in 300 ml. of anhydrous ether, there is added dropwise, with vigorous stirring, a solution of 8 grams of N-(2,2-diethylcyclopropanemethyl)formamide in 150 ml. of anhydrous ether. The reaction mixture is refluxed for three hours after the addition is complete. It is then cooled and treated dropwise with 10 ml. of water. The reaction mixture is then filtered, the solid washed with ether, and filtrate and washings combined. The aqueous layer is removed and the ether solution dried with anhydrous potassium carbonate. The residue from the concentration of the ether solution is fractionally distilled under reduced pressure to yield the desired n-methyl-2,2-diethylcyclopropanemethylamine.

This invention may be variously otherwise embodied within the scope of the appended claims.

What is claimed is:

1. A compound of the formula

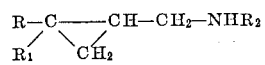

wherein R is a member selected from the group consisting of hydrogen and lower alkyl; $R_1$ is lower alkyl; and $R_2$ is carbo(lower alkoxy).

2. Lower alkyl N-[2,2-di(lower alkyl)cyclopropylmethyl]carbamate.

3. N-(2,2-diethylcyclopropylmethyl)carbamic acid, ethyl ester.

4. N-(2-methyl-2-propylcyclopropylmethyl)carbamic acid, ethyl ester.

References Cited by the Examiner
UNITED STATES PATENTS 3,059,020  10/62  Kaiser et al. _____ 260—468

LORRAINE A. WEINBERGER, *Primary Examiner.*

LEON ZITVER, *Examiner.*